US010943247B1

(12) United States Patent
Spector et al.

(10) Patent No.: US 10,943,247 B1
(45) Date of Patent: Mar. 9, 2021

(54) SYSTEMS AND METHODS FOR PROVIDING EXPEDITED PROMOTIONS

(71) Applicant: JPMorgan Chase Bank, N.A., New York, NY (US)

(72) Inventors: Howard Spector, Woolwich, NJ (US); Dennis Bowers, Middletown, DE (US); Gerald Francis Barks, III, Newark, DE (US); Kim Tate, Bear, DE (US); Brian J. Smyth, West Chester, PA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 380 days.

(21) Appl. No.: 15/423,151

(22) Filed: Feb. 2, 2017

Related U.S. Application Data

(60) Provisional application No. 62/290,335, filed on Feb. 2, 2016.

(51) Int. Cl.
*G06Q 30/02* (2012.01)
(52) U.S. Cl.
CPC .............. *G06Q 30/0222* (2013.01)
(58) Field of Classification Search
CPC ......................................... G06Q 30/02–0277
See application file for complete search history.

(56) References Cited

U.S. PATENT DOCUMENTS

| 8,386,319 | B1* | 2/2013 | Banerjee | G06Q 30/00 |
| | | | | 705/14.66 |
| 10,395,264 | B2* | 8/2019 | Fordyce, III | G06Q 30/04 |
| 2002/0147669 | A1* | 10/2002 | Taylor | G06Q 30/02 |
| | | | | 705/35 |
| 2004/0088219 | A1* | 5/2004 | Sanders | G06Q 30/02 |
| | | | | 705/14.15 |
| 2005/0160003 | A1* | 7/2005 | Berardi | G06Q 20/352 |
| | | | | 705/14.17 |
| 2006/0165060 | A1* | 7/2006 | Dua | G06Q 20/20 |
| | | | | 370/352 |
| 2007/0038515 | A1* | 2/2007 | Postrel | G06Q 20/06 |
| | | | | 705/14.3 |
| 2007/0192245 | A1* | 8/2007 | Fisher | G06Q 20/02 |
| | | | | 705/39 |

(Continued)

FOREIGN PATENT DOCUMENTS

WO    WO-0241209 A1 *  5/2002  ......... G06Q 30/0226

OTHER PUBLICATIONS

Susan Farmer, "Americans aren't half as quick as others to let their" Colombian Vancouver, Wash Jan. 15, 1995, p. 1.*

*Primary Examiner* — Raquel Alvarez
(74) *Attorney, Agent, or Firm* — Greenberg Traurig LLP

(57) ABSTRACT

Systems and methods for providing expedited promotions are disclosed. In one embodiment, a method may include (1) a financial institution server comprising at least one computer processor receiving, from a merchant, a transaction comprising an identification of a good or service, a customer financial instrument issued by the financial institution, and a promotion identifier; (2) the financial institution server retrieving a promotion associated with the promotion identifier; (3) the financial institution server approving the transaction with the financial instrument; and (4) the financial institution server automatically applying the promotion to the transaction.

14 Claims, 4 Drawing Sheets

(56) References Cited

U.S. PATENT DOCUMENTS

| | | | |
|---|---|---|---|
| 2010/0106598 A1* | 4/2010 | Grimes | G06Q 30/02 705/14.53 |
| 2010/0211445 A1* | 8/2010 | Bodington | G06Q 20/102 705/14.17 |
| 2012/0290376 A1* | 11/2012 | Dryer | G06Q 20/3278 705/14.23 |
| 2013/0060623 A1* | 3/2013 | Walker | G06Q 50/01 705/14.27 |
| 2013/0060635 A1* | 3/2013 | Walker | H04W 4/21 705/14.58 |
| 2013/0110658 A1* | 5/2013 | Lyman | G06Q 20/20 705/18 |
| 2014/0025460 A1* | 1/2014 | Knowles | G06Q 30/0222 705/14.23 |
| 2014/0108119 A1* | 4/2014 | Choi | G06Q 30/0226 705/14.27 |
| 2020/0294094 A1* | 9/2020 | Brock | G06Q 30/0268 |

* cited by examiner

SYSTEMS AND METHODS FOR PROVIDING EXPEDITED PROMOTIONS

RELATED APPLICATIONS

The present application claims priority to U.S. Provisional Patent Application Ser. No. 62/290,335, filed Feb. 2, 2016, the disclosure of which is hereby incorporated by reference in its entirety.

BACKGROUND OF THE INVENTION

1. Field of the Invention

Embodiments disclosed herein generally relate to systems and methods for providing expedited promotions.

2. Description of the Related Art

Merchants often offer incentives to their customers to encourage or incentivize the customers to make a purchase. Some incentives are sponsored by a financial institution partner; others are offered independently by the merchant. Incentives may have time restrictions to encourage timely purchases.

SUMMARY OF THE INVENTION

Systems and methods for providing expedited promotions are disclosed. In one embodiment, a method may include (1) a financial institution server comprising at least one computer processor receiving, from a merchant, a transaction comprising an identification of a good or service, a customer financial instrument issued by the financial institution, and a promotion identifier; (2) the financial institution server retrieving a promotion associated with the promotion identifier; (3) the financial institution server approving the transaction with the financial instrument; and (4) the financial institution server automatically applying the promotion to the transaction.

The transaction may be an in-person transaction, an on-line transaction, a purchase from within an application (i.e., an in-app purchase), etc.

In one embodiment, the method may further include the financial institution server settling the transaction with the merchant.

In one embodiment, the financial institution server may receive the promotion from a third party using the promotion identifier.

In one embodiment, the financial institution server may report application of the promotion to the transaction to the customer.

According to another embodiment, a method for expedited promotion processing may include (1) a merchant server receiving a transaction comprising an identification of a good or service from a customer; (2) the merchant server communicating the transaction to a financial institution; (3) the merchant sever receiving a promotion to offer the customer from the financial institution; (4) the merchant server presenting the promotion to the customer, the promotion involving a financial instrument issued by the financial institution; (5) the merchant server receiving acceptance of the promotion from the customer; (6) the merchant server conducting the transaction with the financial instrument; and (7) the merchant server providing settlement transaction to the financial institution.

The transaction may be an in-person transaction, an on-line transaction, an in-app purchase, etc.

In one embodiment, the method may further include the merchant server presenting an application for the financial instrument to the customer; and the merchant server communicating a completed application for the financial instrument to the financial institution.

In one embodiment, the financial instrument may be received as a token from an electronic device associated with the customer.

In one embodiment, the method may further include the merchant server settling the transaction with the financial institution.

According to another embodiment, a method for expedited promotion processing may include (1) a financial institution server comprising at least one computer processor receiving, from a merchant server, a transaction comprising an identification of a good or service; (2) the financial institution server identifying a promotion to offer the customer, the promotion involving a financial instrument issued by the financial institution; (3) the financial institution server communicating an offer for the promotion to the merchant server; (4) the financial institution server receiving acceptance of the offer; (5) the financial institution server approving the customer for the financial instrument; (6) the financial institution provisioning a token for the financial institution to an electronic wallet associated with the customer; (7) the financial institution server approving the transaction with the financial instrument; and (8) the financial institution server automatically applying the promotion to the transaction.

The transaction may be an in-person transaction, an on-line transaction, an in-app purchase, etc.

In one embodiment, the method may further include the financial institution server settling the transaction with the merchant.

In one embodiment, the financial institution server may receive the promotion from a third party using the promotion identifier.

In one embodiment, the method may further include the financial institution server reporting application of the promotion to the transaction to the customer.

In one embodiment, the method may further include the financial institution server presenting an application for the financial instrument to the customer; and the financial institution server receiving a completed application for the financial instrument for the customer from the merchant server.

BRIEF DESCRIPTION OF THE DRAWINGS

For a more complete understanding of the present invention, the objects and advantages thereof, reference is now made to the following descriptions taken in connection with the accompanying drawings in which.

DESCRIPTION OF PREFERRED EMBODIMENTS

Figure 1:
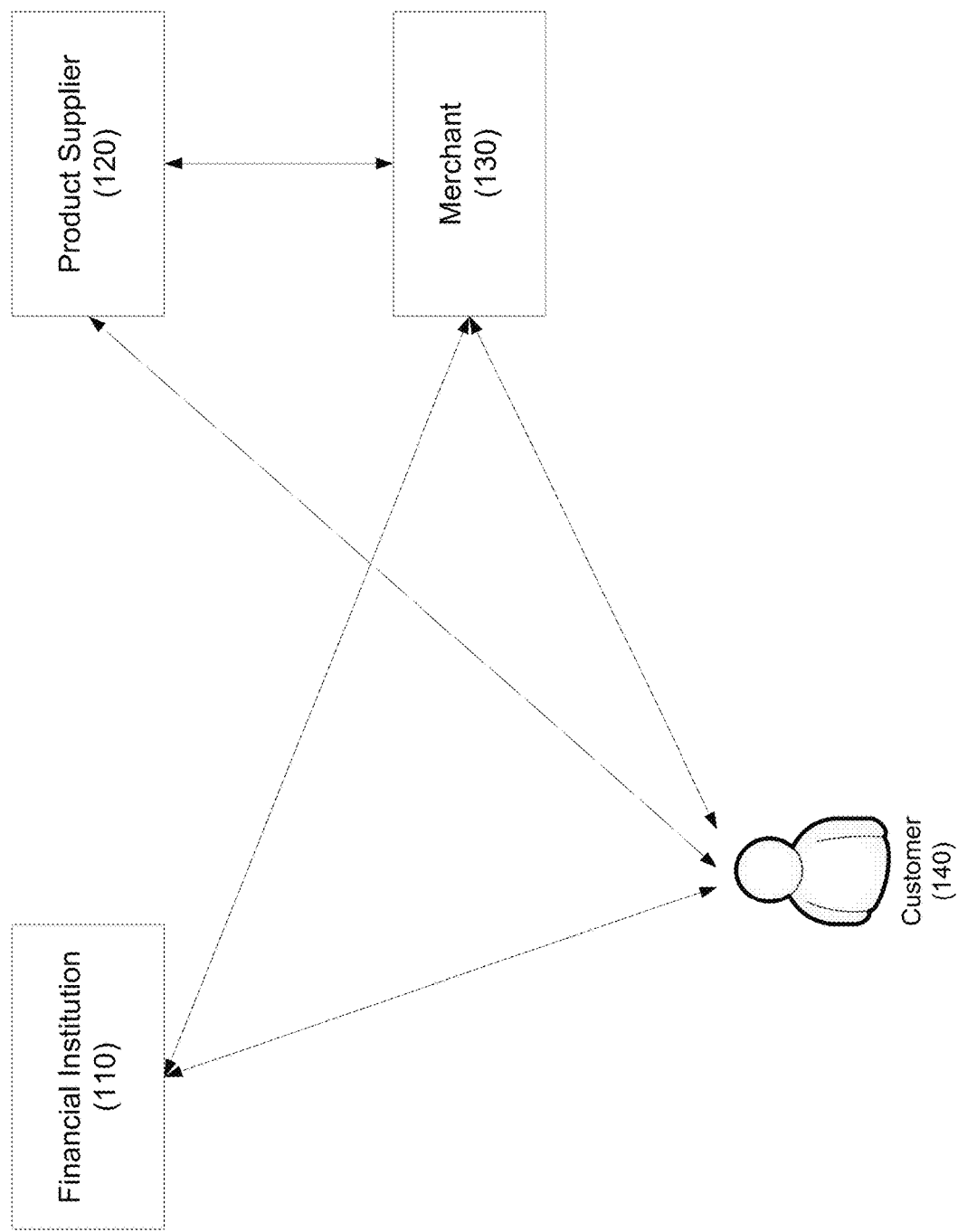
FIG. 1 depicts a system for providing expedited promotions according to one embodiment.

Embodiments relate to systems and methods for providing expedited promotions.

Embodiments may simplify the process of applying a promotion to a transaction. For example, a customer may be provided with an innovative experience by leveraging a financial instrument issuer's existing ability to pre-screen/ acquire the customer with confidence and the ability to apply various promotions to individual transactions. Embodiments may pre-screen customers and/or have customers compete a short application, which increases confidence in the credit or promotion offer. Embodiments may involve an alternate acquisition flow, which may process a full application if a pre-screen offer is not presented. Embodiments may also automatically provision an acquired card into an electronic wallet, mobile wallet, and/or mobile payment service.

Example promotions include installment plan promotions to an existing or new customer's account, rate sale promotions (e.g., low or 0% APR for a selected time period); deferred billing promotions (0%, no payments for a selected time period); unique minimum due promotions (e.g., reduced or increased payment for a selected time period based on a unique minimum due percentage or fixed amount which may be combined with a rate sale offer); fixed pay fixed term promotions (e.g., promotional balance billed in equal installments based on an installment amount or duration that may be pre-defined in the promotion which may be combined with a rate sale); non-standard rate sale promotions (e.g., tiered APRs based on the qualifying amount, promotional APR's that "flip" to a second promotional APR after a selected timeframe before rolling to contract rates, etc.); rewards promotions (e.g., qualifying transactions can receive special promotional rewards in the form of points, cash, or physical items); instant credit promotions, etc. In one embodiment, the promotions may apply to an existing account or a new account. Other promotions, and combinations thereof, may be made as is necessary and/or desired.

Embodiments support both direct and indirect promotions, meaning that the promotional pricing can be applied either directly by the merchant or indirectly by the financial institution based, for example, on characteristics of the transaction.

Embodiments may work with both open and closed loop transaction processing, but are not limited thereto. Embodiments may also leverage in-house payment processing networks to allow the open and/or loop processing path to be taken while still passing promotional pricing details. An example of such a payment processing network is JPMorgan Chase Bank's ChaseNet.

Embodiments may include customer-directed promotions that may be leveraged when the issuer provides an offer to the customer. The customer may pre-stage a transaction related to the offer online, use it from a mobile wallet (e.g., like ChasePay, ApplePay, etc.), or indirectly by, for example, a set of customer-defined rules.

Embodiments may combine promotions with rewards programs to allow the customer to increase the benefit of the promotion. For example, a fixed payment, fixed term, or other promotion may be offered with an additional incentive of the receipt of reward points once the promotion is complete (e.g., the balance is paid in full).

Embodiments may make promotions and other offers available to an issuer's third party partners via a set of services that enable the third party to provide these enhancements to the issuer's customers.

Embodiments may include promotions that support an upgrade or trade in option that may allow the customer to take their old merchandise back to the merchant and replace it with a newer model (e.g., replace an old smartphone with the newest model). For example, the merchant may pay any remaining balance on the existing promotion, and may then initiate a new promotional pricing offer on an upgraded or new product.

Referring to FIG. 1, a system for providing expedited promotions is provided according to one embodiment. System 100 may include financial institution 110, product supplier 120, and merchant 130. Customer 140 may be a customer of one or more of financial institution 110 and merchant 130.

Financial institution 110 may issue financial instruments, offer lines of credit, etc. In one embodiment, financial institution 110 and one or more of product supplier 120 and merchant 130 may have a relationship. For example, financial institution 110 may offer promotions for purchases of a product supplied by product supplier 120, or for purchases made from merchant 130.

Merchant 130 may be a provider, reseller, etc. of goods or services. Merchant 130 may be a brick-and-mortar merchant, an online merchant, a software developer (e.g., an application developer), a third party aggregator for a plurality of merchants, etc.

In one embodiment, product supplier 120 and merchant 130 may be the same entity.

Figure 2:
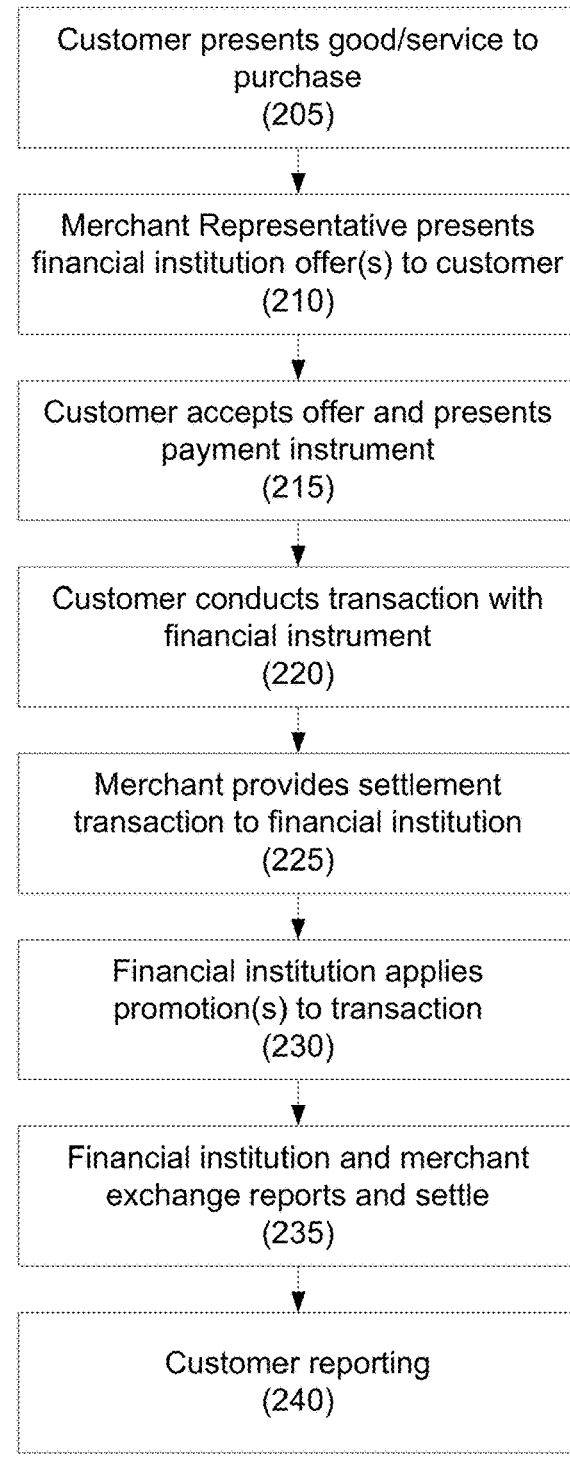
FIG. 2 depicts a method for providing expedited promotions according to one embodiment.

Referring to FIG. 2, a method for providing expedited promotions is disclosed according to one embodiment. In this example, the customer may already have a credit product (e.g., a credit card, a line of credit) or other account with a financial institution (such as a bank, the issuer of the credit card, etc.).

In step 205, the customer may select a good or service to purchase, and may present the good or service to a merchant or merchant representative for purchase. The good or service may be selected at a merchant location (e.g., at a brick and mortar location) or online. In one embodiment, the merchant representative may be physically present with the customer; in another embodiment, the merchant representative may communicate by chat, video, etc. In still another embodiment, the merchant representative may be a virtual merchant representative. In still another embodiment, the customer may simply place a good or service in an online shopping cart.

In another embodiment, the customer may make a purchase within an application (e.g., an "in-app purchase:)" Any suitable type of purchase may be presented as is necessary and/or desired.

In step 210, the merchant representative may present at least one offer for a promotion to the customer. The offer(s) may be presented in person, on-line, through an application on the customer's mobile device, within an application, on a receipt (e.g., a code), etc. Any suitable manner of presenting the offer(s) may be used as necessary and/or desired.

As discussed above, any suitable offer for a promotion may be presented to the customer.

In one embodiment, offer(s) may be included in a customer's electronic wallet, in an on-line account, etc. Examples are disclosed in U.S. patent application Ser. Nos. 14/699,511 and 14/744,608, the disclosures of which are hereby incorporated, by reference, in their entireties.

In one embodiment, the promotion may be offered by the financial institution. In another embodiment, the promotion may be offered by the merchant, a merchant aggregator, a product supplier (e.g., manufacturer or supplier of the good/ service), etc.

In step 215, the customer may accept one or more offer. In one embodiment, the customer may verbally accept the offer(s), and may be presented with the offer(s), any terms and conditions, etc. during payment.

In another embodiment, the customer may accept the offer(s) using an electronic device.

In one embodiment, the offer may be accepted by the customer using the financial instrument or account with which the offer is associated.

Any other suitable manner of accepting the offer(s) may be used as is necessary and/or desired.

In one embodiment, the offer may be accepted before conducting the transaction, or it may be accepted after the transaction is applied and may be retroactively applied.

In step 220, the customer may conduct the transaction using a financial instrument or account associated with the financial institution (e.g., a credit card issued by the financial institution). For example, the representative may charge the customer's financial instrument in the usual fashion for some or all of the amount, and the system may store the offer code and provides a summary of the offer on the customer's receipt.

In another embodiment, the financial institution may provision a token to the customer's electronic device. For example, if the customer is purchasing a new electronic device that may include an electronic wallet (e.g., a smartphone), the financial institution may provision a payment token to the new device and the customer may conduct the transaction using the new device.

If the customer is trading in an old device, the financial institution may deactivate any token that may be provisioned for the old device.

Following the transaction, for in-person transactions, the customer may leave with the good or service. In another embodiment, for online transactions, fulfillment of the order for the good or service may be performed.

In step 225, the merchant may provide the settlement transaction to the financial institution. This may include the promotion identifier for the promotion(s) that were accepted. In one embodiment, this may occur at the time of the transaction, periodically (e.g., nightly, weekly, etc.), or as otherwise necessary and/or desired.

In step 230, the financial institution may apply the promotion(s) to the transaction. In one embodiment, the financial institution may retrieve the specifics of the promotion using the promotion identifier. In another embodiment, the financial institution may retrieve the specifics of the promotion from a third party (e.g., merchant, merchant aggregator, provider, etc.).

In step 235, the financial institution and the merchant may periodically (e.g., monthly), exchange reporting, and may process any fees and/or incentives.

In step 240, the application of the promotion may be reported to the customer in any suitable manner, including on a statement (e.g., a monthly credit card statement), on-line, by notification, etc.

In another embodiment, the merchant may not present an offer for a promotion to the customer, but a promotion may be available nevertheless. For example, a manufacturer, merchant, merchant aggregator, and/or financial institution may offer a promotion for a product that does not require an offer identifier. To conduct the transaction, the merchant may process the transaction without entry of any promotion/offer codes.

At the back end, the issuer may match the transaction based on a merchant identifier, a good/service description, a characteristic of the transaction, a presented payment device, etc. and may apply a promotion to the transaction automatically.

Figure 3:
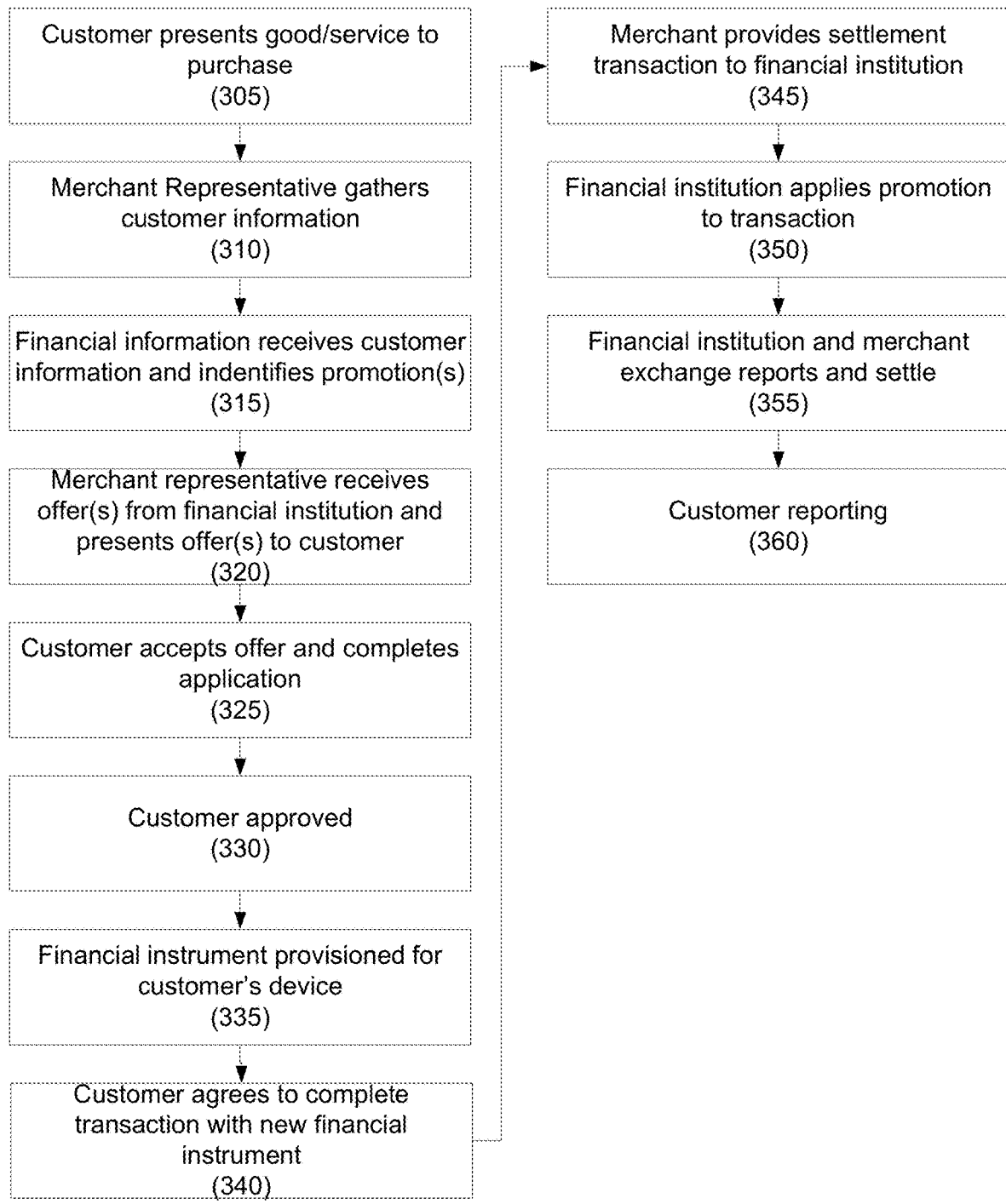
FIG. 3 depicts a method for providing expedited promotions according to one embodiment.

An example of such a process is provided in FIG. 3, which discloses a method for providing expedited promotions according to one embodiment. In this example, the customer may not have a relationship (e.g., a credit card, line of credit, or account) with the financial institution offering the promotion.

In step 305, the customer may select a good or service to purchase, and may present the good or service to a merchant representative for purchase. This may be similar to step 205, above.

In step 310, the merchant representative may gather customer information. This may be performed, for example, during an existing checkout process. In one embodiment, the customer's name, address, device identifier, etc. may be gathered.

In step 315, the financial institution may receive the information from the merchant, and may identify one or more promotion to offer to the customer.

In step 320, the merchant representative may receive the promotion(s) to offer the customer from the financial institution and may present the promotion(s) to the customer. The offer(s) may be presented in person, on-line, through an application on the customer's mobile device, etc. Any suitable manner of presenting the offer(s) may be used as necessary and/or desired.

In step 325, the customer may accept one or more offer. This may be similar to step 215, above.

In one embodiment, the customer may complete an application for a financial instrument, account, etc. with the financial institution. In one embodiment, the application may be completed using the customer's electronic device, a merchant electronic device, etc.

In step 330, the financial institution may perform decisioning and may approve or reject the customer's application.

In step 325, the financial instrument may establish an account and/or financial institution for the customer, and may provision a financial instrument to an electronic wallet stored on the customer's electronic device as, for example, a token.

In step 340, the customer may conduct the transaction using the financial instrument or account associated with the financial institution. The customer may also conduct the transaction using the token that was provisioned for the device. This may be similar to step 220, above.

Following the transaction, for in-person transactions, the customer may leave with the good or service. In another embodiment, for online transactions, fulfillment of the order for the good or service may be performed.

In step 345, the merchant may provide the settlement transaction to the financial institution. This may be similar to step 225, above.

In step 350, the financial institution may apply the promotion(s) to the transaction. This may be similar to step 230, above.

In step 355, the financial institution and the merchant may periodically (e.g., monthly), exchange reporting, and may process any fees and/or incentives. This may be similar to step 235, above.

In step 360, the application of the promotion may be reported to the customer in any suitable manner, including on a statement (e.g., a monthly credit card statement), on-line, by notification, etc. This may be similar to step 240, above.

Figure 4:
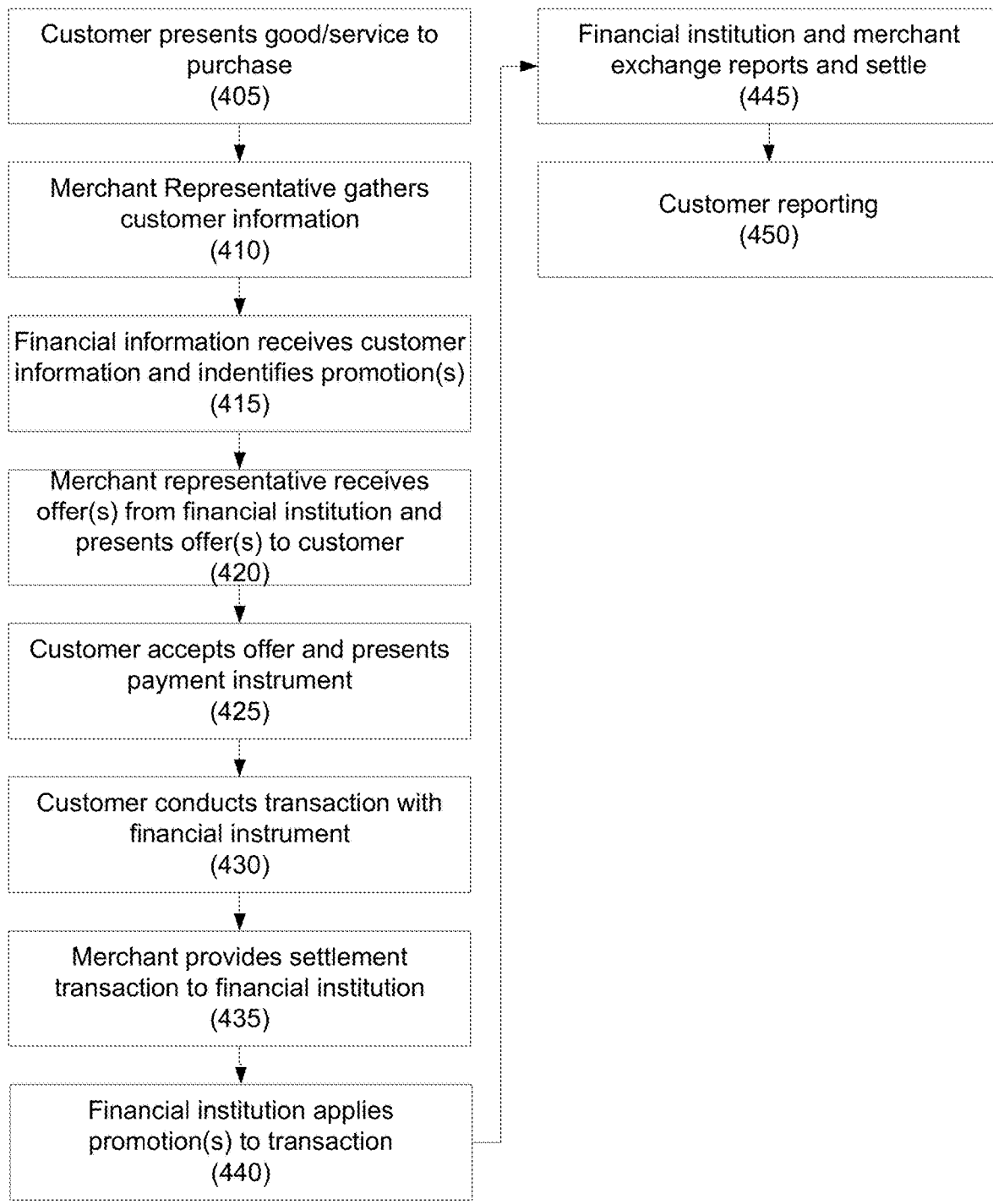
FIG. 4 depicts a method for providing expedited promotions according to one embodiment.

Referring to FIG. 4, an acquisition flow for providing expedited promotions is disclosed according to another embodiment.

In step 405, the customer may select a good or service to purchase, and may present the good or service to a merchant representative for purchase. This may be similar to step 205, above.

In step 410, the merchant representative may gather customer information. This may be performed, for example, during an existing checkout process. In one embodiment, the customer's name, address, device identifier, etc. may be gathered. This may be similar to step 310, above.

In step 415, the financial institution may receive the information from the merchant, and may identify one or more promotion to offer to the customer. This may be similar to step 315, above.

In step 420, the merchant representative may receive the promotion(s) to offer the customer from the financial institution and may present the promotion(s) to the customer. The offer(s) may be presented in person, on-line, through an application on the customer's mobile device, etc. Any suitable manner of presenting the offer(s) may be used as necessary and/or desired. This may be similar to step 320, above.

In step 425, the customer may accept one or more offer. In one embodiment, the customer may verbally accept the offer(s), and may be presented with the offer(s), any terms and conditions, etc. during payment. This may be similar to step 215, above.

In step 430, the customer may conduct the transaction using a financial instrument or account associated with the financial institution. In one embodiment, this may constitute acceptance of the offer(s). This may be similar to step 220, above.

Following the transaction, for in-person transactions, the customer may leave with the good or service. In another embodiment, for online transactions, fulfillment of the order for the good or service may be performed.

In step 435, the merchant may provide the settlement transaction to the financial institution. This may include the offer identifier for the offers(s) that were accepted. In one embodiment, this may occur at the time of the transaction, periodically (e.g., nightly, weekly, etc.), or as otherwise necessary and/or desired. This may be similar to step 225, above.

In step 440, the financial institution may apply the promotion(s) to the transaction. This may be similar to step 230, above.

In step 445, the financial institution and the merchant may periodically (e.g., monthly), exchange reporting, and may process any fees and/or incentives. This may be similar to step 235, above.

In step 450, the application of the promotion may be reported to the customer in any suitable manner, including on a statement (e.g., a monthly credit card statement), on-line, by notification, etc. This may be similar to step 240, above.

The following documents are incorporated, by reference, in their entireties: U.S. Pat. Nos. 5,870,721; 5,940,811; 6,105,107; 7,370,004, and 8,352,370; and U.S. patent application Ser. Nos. 10/683,294; 11/447,031; 11/488,783; 11/968,036; 13/022,953; 11/610,289; and Ser. No. 13/803,298.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory.

The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories.

However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for expedited promotion processing, comprising:
   a financial institution server comprising at least one computer processor tokenizing an account of a financial instrument in response to receiving an acceptance of an offer for the financial instrument from a merchant server;
   the financial institution server pushing a token of the tokenized account to a mobile electronic device;
   the financial institution server receiving, from the merchant server, a pending transaction comprising an identification of a good or service, the token, and a promotion identifier comprising an identifier that identifies a promotion associated with the account of the financial instrument, wherein the pending transaction is an in-app purchase made using an application executed by the mobile electronic device;
   the financial institution server retrieving a promotion associated with the promotion identifier;
   the financial institution server approving the pending transaction with the token; and
   the financial institution server automatically applying the promotion to the account of the token, wherein applying the promotion to the account comprises at least one of selecting an annual percentage rate (APR) of the account, adjust a billing period of the account, adjusting a minimum due percentage or fixed amount of the account, or adjusting an installment amount of the account.

2. The method of claim 1, further comprising:
   the financial institution server settling the pending transaction with the merchant server.

3. The method of claim 1, wherein the financial institution server receives the promotion from a third party using the promotion identifier.

4. The method of claim 1, further comprising:
   the financial institution server reporting application of the promotion to the pending transaction to the customer.

5. The method of claim 1, further comprising: the financial institution server retrieving the promotion associated with the promotion identifier by accessing a database that stores the promotion using the promotion identifier, the promotion being included in an electronic wallet stored on the mobile electronic device.

6. The method of claim 1, further comprising wherein an application for the financial instrument is presented by the merchant server to the customer to complete, the method further comprising the financial institution server receiving a completed application and approving the completed application to establish the account.

7. A method for expedited promotion processing, comprising:
   a financial institution server comprising at least one computer processor receiving, from a merchant server, a pending transaction comprising an identification of a good or service and a promotion identifier;
   the financial institution server identifying a promotion to offer a customer according to the promotion identifier, the promotion involving a financial instrument issued by the financial institution;
   the financial institution server communicating an offer for the promotion to the merchant server;
   the financial institution server receiving acceptance of the offer;
   the financial institution server approving the customer for the financial instrument in response to the acceptance;
   the financial institution provisioning a token for the financial institution to an electronic wallet associated with the customer;
   the financial institution server approving the pending transaction with the financial instrument; and
   the financial institution server automatically applying the promotion to an account of the financial instrument, wherein applying the promotion to the account comprises at least one of selecting an annual percentage rate (APR) of the account, adjust a billing period of the account, adjusting a minimum due percentage or fixed amount of the account, or adjusting an installment amount of the account.

8. The method of claim 7, further comprising:
   the financial institution server settling the pending transaction with the merchant.

9. The method of claim 7, wherein the pending transaction is an in-person transaction.

10. The method of claim 7, wherein the pending transaction is an on-line transaction.

11. The method of claim 7, wherein the financial institution server receives the promotion from a third party using the promotion identifier.

12. The method of claim 7, further comprising:
    the financial institution server reporting application of the promotion to the pending transaction to the customer.

13. The method of claim 7, further comprising:
    the financial institution server presenting an application for the financial instrument to the customer; and
    the financial institution server receiving a completed application for the financial instrument for the customer from the merchant server.

14. The method of claim 7, wherein the pending transaction is an in-app purchase made using an application executed by a mobile electronic device.

* * * * *